United States Patent

[11] 3,618,927

[72] Inventor Lawrence George Nicholls
    Tyseley, Birmingham, England
[21] Appl. No. 819,390
[22] Filed Apr. 25, 1969
[45] Patented Nov. 9, 1971
[73] Assignee Girling Limited
    Birmingham, England
[32] Priority Apr. 26, 1968
[33] Great Britain
[31] 20068/68

[54] VEHICLE SUSPENSION UNITS
    2 Claims, 7 Drawing Figs.
[52] U.S. Cl. ................................................. 267/8,
                                                267/34, 267/177
[51] Int. Cl. ........................................ F16f 13/00
[50] Field of Search ................................ 267/34, 8,
                                                              177

[56] References Cited
    UNITED STATES PATENTS
2,756,045  7/1956  Savory .......................... 267/8

Primary Examiner—James B. Marbert
Attorney—Scrivener, Parker, Scrivener and Clarke ABSTRACT: A vehicle suspension unit which comprises a telescopic hydraulic damper and a coil compression spring fitting over the body of the damper and abutting at one end against a collar on the piston rod of the damper and at the other end against a sleeve adjustably surrounding the body, the sleeve engaging the body through the intermediary of cam means such that angular movement of the sleeve around the body causes adjustment of the axial position of the sleeve on the body, the cam means positively locating the ring in at least two different positions of adjustment, mainly characterized in that the sleeve comprises an inner portion (4) whose end face is shaped to constitute a cam surface (7) engaging projections (h) on the body of the damper and an outer portion (3) surrounding the inner portion and projecting axially beyond the shaped end face thereof.

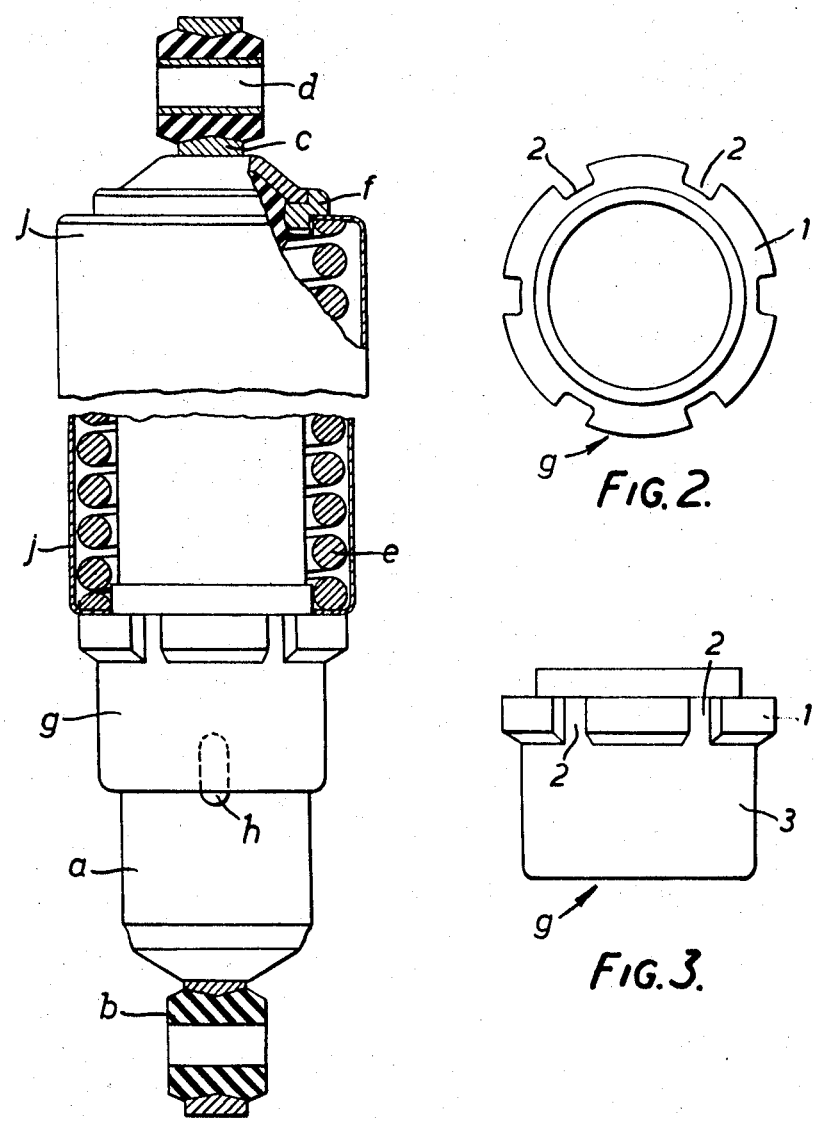

VEHICLE SUSPENSION UNITS

This invention relates to vehicle suspension units comprising a telescopic hydraulic damper and a coil compression spring engaged between the two relatively movable parts of the damper. A pair of such units may form the rear wheel suspension of a motorcycle, one of the units being disposed on each side of the wheel.

British Pat. specification No. 713,214 discloses a suspension unit in which a coil compression spring fits over the body of a telescopic hydraulic damper and abuts at one end against a collar on the piston rod of the damper and at the other end against a sleeve which adjustably surrounds the body of the damper, the adjustable sleeve engaging the body through the intermediary of cam means such that angular movement of the ring around the body causes adjustment of the axial position of the sleeve on the body, the cam means positively locating the ring in at least two different positions of adjustment.

The present invention provides an improved construction of the adjustable sleeve in such a unit, the sleeve being so designed as to afford protection for the cam surfaces against dirt and to provide mechanical reinforcement of the cam.

In accordance with the invention, the said sleeve comprises an inner portion whose end face is shaped to constitute a cam surface engaging projecting means on the body of the damper and an outer portion surrounding the inner portion and projecting axially beyond the shaped end face thereof.

Preferably, the sleeve is made as an integral diecasting. This production technique lends itself to close control of dimensions without additional machining and is obviously desirable from this point of view, compared with fabrication or steel casting. However, metals which are suitable for pressure diecasting, such as light alloy or zinc base alloy are not as strong as steel, and in a conventional design of sleeve would have to be greatly increased in thickness to achieve sufficient strength. By virtue of the present invention however, a sleeve made by diecasting has its cam surface effectively reinforced by the outer portion of the sleeve which surrounds the cam surfaces, which are thereby restrained against lateral deformation under compressive loads.

In accordance with a preferred feature, the sleeve is provided with circumferentially spaced recesses which can be engaged by a standard C-spanner for effecting angular adjustment of the sleeve, thereby enabling the degree of compression of the spring to be readily varied to correspond with variation in the static load imposed on the suspension, for example according to whether or not a pillion passenger is carried on a motorcycle to which the suspension unit is fitted.

Further to facilitate adjustment of the sleeve, there may be provided an adjuster member comprising a ring and an arm projecting radially therefrom, the ring surrounding the body of the damper, interposed between the spring and the adjustable sleeve, and making positive keying engagement with the recesses in the sleeve.

A particular vehicle suspension unit constructed in accordance with the invention is further described below with reference to the accompanying drawing, in which:

FIG. 1 is a part sectional side view of the complete unit;

FIGS. 2, 3 and 4 are respectively a plan view, a side elevation and a sectional elevation of the adjustable sleeve alone;

Figure 4:
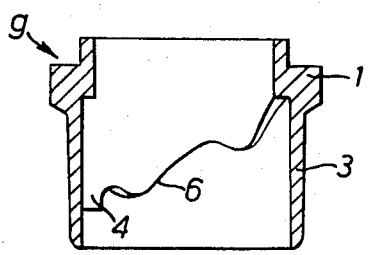
Figure 5:
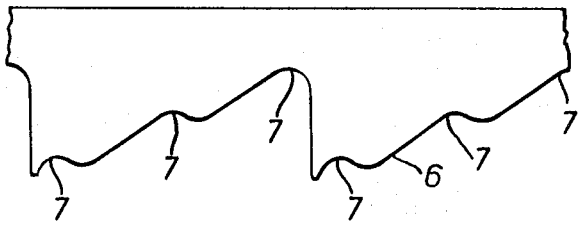
FIG. 5 is a developed view of the cam profile of the sleeve.

Referring first to FIG. 1, the body $a$ of a telescopic hydraulic damper has at its lower end an eye $b$ for connection to the rear wheel spindle of a motorcycle. The piston rod $c$ of the damper has at its upper end a similar eye $d$ for connection to the frame of the motorcycle. A helical compression spring $e$ fits over the upper part of the damper and abuts at its upper end against a flanged collar $f$ fixed on the piston rod $c$. The lower end of the spring abuts against a sleeve $g$ which surrounds the damper body and is supported on a pair of diametrically opposite lugs $h$ projecting radially from the damper body. The spring is enclosed in a light telescopic dust shield $j$, whose ends are flanged and are retained by the ends of the spring.

The sleeve $g$, shown separately in FIGS. 2 to 5, may be formed by a light alloy, or zinc base alloy, diecasting. The sleeve slidably and rotatably embraces the damper body and has an outwardly projecting collar 1 affording the abutment for the spring. The collar 1 has its periphery formed with gaps or castellations constituting six equally spaced recesses 2, which can receive the tongue of a standard C-spanner. Recesses serving the same purpose can of course be provided in other ways than that shown, as by forming the adjustable sleeve with spaced projections, the gaps between which constitute the required recesses.

The portion 5 of the sleeve above the collar 1 constitutes a spigot which fits within the end coil of the spring. Below the collar 1, the sleeve comprises an inner portion 4, whose end face 6 is shaped to constitute a cam surface engaging the lugs $h$ on the damper body, and an outer portion 3 which projects axially beyond the shaped end face 6 of the inner portion and serves both to shield the cam surface from dirt and to strengthen the casting. The cam surface 6 (shown developed in FIG. 5) comprises two similar sections, each extending over 180° of arc and cooperating respectively with the two lugs $h$. Each section includes three notches 7 which are spaced apart axially and cooperate with the lugs to effect positive location of the adjustable sleeve in any one of three different positions of adjustment.

Figure 6:
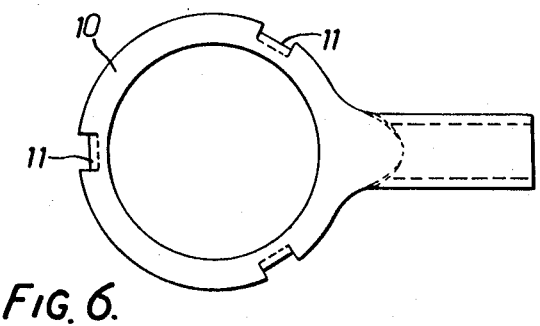
FIGS. 6 and 7 are respectively a plan view and a sectional elevation of an adjuster member.
Figure 7:
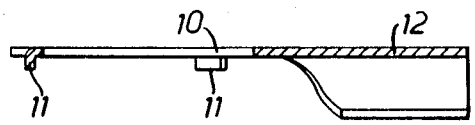

The adjuster member shown in FIGS. 6 and 7 may be fitted to the suspension unit either as original equipment or during servicing. It is constituted by a sheet metal pressing shaped to have a ring 10 with a plurality of axially directed tongues 11 struck out of its periphery, and a tubular, radial arm 12. In use, the ring is fitted over the damper body and against the upper face of the collar 1 (i.e., the face further from the sleeves 3 and 4) and the tongues 11 are engaged with conveniently positioned recesses 2. The coil spring presses the ring firmly against the collar. Angular adjustment can be effected by moving the arm 12, either directly by hand when spring loads are low, or by means of a tommy-bar inserted in the tubular arm 12 when spring loads are high, the complete range of adjustment requiring less than 180° of angular movement. The arm 12 may be covered by a removable plastics cap (not shown) to protect the user's clothing against tearing. Even when the adjuster member is fitted, angular adjustment can still be effected by means of a C-spanner, as already described, should this be more convenient.

I claim:

1. In a vehicle suspension unit, comprising:
   a telescopic hydraulic damper including a cylindrical body, a piston working in said body and a piston rod connected to said piston; and
   a coil compression spring fitting over said damper body and abutting at one end against a collar on said piston rod and at the other end against a sleeve surrounding said damper body and angularly and axially adjustable thereon,
   said sleeve engaging said body through the intermediary of cam means which cause axial adjustment of said sleeve in response to angular adjustment thereof and which positively locate said sleeve in each of at least two different positions of adjustment,
the improvement which comprises said sleeve having a radially inner portion having an end face constituting a cam surface, and a radially outer portion surrounding said inner portion and projecting axially beyond said end face thereof.

2. The improved unit of claim 1, wherein said sleeve is formed as a diecasting.

* * * * *